April 1, 1958   J. W. OEHRLI   2,828,907
HIGH SPEED FRICTION DRIVE
Filed Oct. 26, 1953   3 Sheets-Sheet 1

John W. Oehrli
Inventor.

By
Attorney

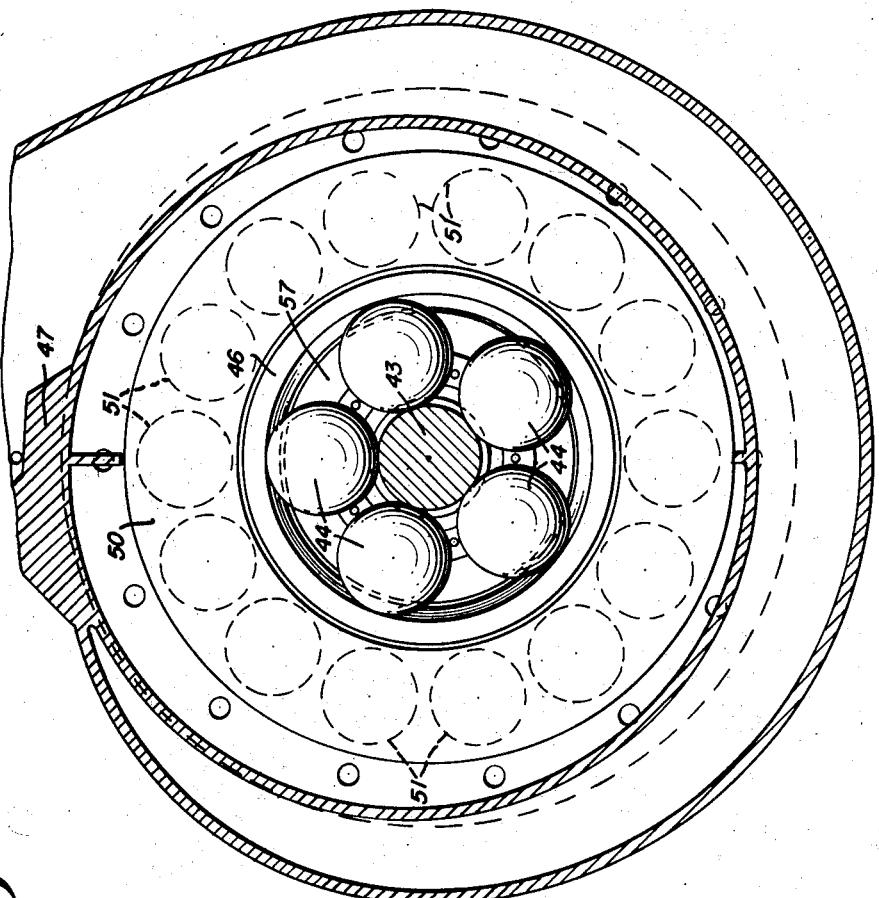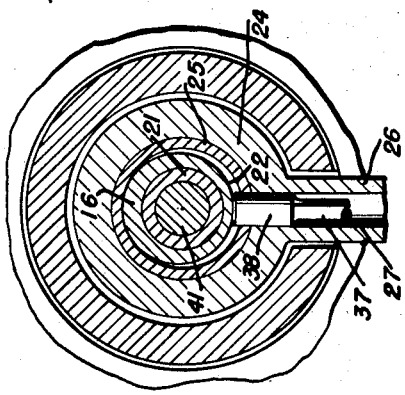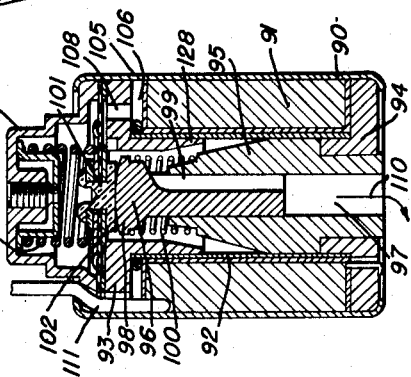

April 1, 1958     J. W. OEHRLI     2,828,907
HIGH SPEED FRICTION DRIVE

Filed Oct. 26. 1953     3 Sheets-Sheet 3

John W. Oehrli
INVENTOR.

BY
Attorney

United States Patent Office

2,828,907
Patented Apr. 1, 1958

2,828,907

HIGH SPEED FRICTION DRIVE

John W. Oehrli, Los Angeles, Calif., assignor to McCulloch Motors Corporation, Los Angeles, Calif., a corporation of Wisconsin Application October 26, 1953, Serial No. 388,248

6 Claims. (Cl. 230—215)

This invention relates in general to variable speed transmissions and relates in particular to a variable speed drive especially adapted for use with superchargers arranged to feed air under pressure to internal combustion engines.

It is an object of the invention to provide a supercharger system especially adapted for use with internal combustion engines, having a control which is operative under different power requirement conditions of operation of the engine, referred to herein as a first condition of operation including cruising or slow acceleration operation and a second condition of operation including high power or fast acceleration operation of the engine.

It is a further object of the invention to provide a system which will supply air under pressure to an internal combustion engine wherein under the first condition of operation the pressure of the air delivered thereto will be limited within a predetermined low range, and wherein, under the second condition of operation the pressure limitation referred to in the foregoing is removed so that the system will deliver to the engine air under greater pressure contributing to greater power output and faster acceleration of the engine.

It is a further object of the invention to provide a supercharger system having a supercharger which is driven from the internal combustion engine through a variable speed drive and which has a control for the variable speed drive which limits the maximum air pressure delivered by the supercharger during a specified cruising operation of the engine, this control also having means which removes the pressure limitation and thereafter controls the operation of the variable speed drive in such a manner as to prevent driving of the supercharger at a speed greater than a second maximum speed during the high power or rapid acceleration condition of operation of the engine.

It is an object of the invention to provide in this supercharger system a high speed planetary friction drive of simple form capable of high speed operation for relatively long periods of time.

It is an object of the invention to provide a high speed drive of this type having a simple and effective arrangement for lubricating the same.

Further objects and advantages of the invention may be brought out in the following part of the specification wherein I have described in detail and for the purpose of making a complete disclosure, a preferred embodiment of my invention, without any intent to thereby limit the scope of the invention which is set forth in the appended claims.

Referring to the accompanying drawings which are for illustrative purposes only:

Fig. 2 is a cross section taken as indicated on the line 2—2 of Fig. 1;

Fig. 3 is a fragmentary section taken as indicated by the line 3—3 of Fig. 1;

Fig. 4 is an enlarged sectional view of the pressure responsive regulator device of the system;

Figure 1:
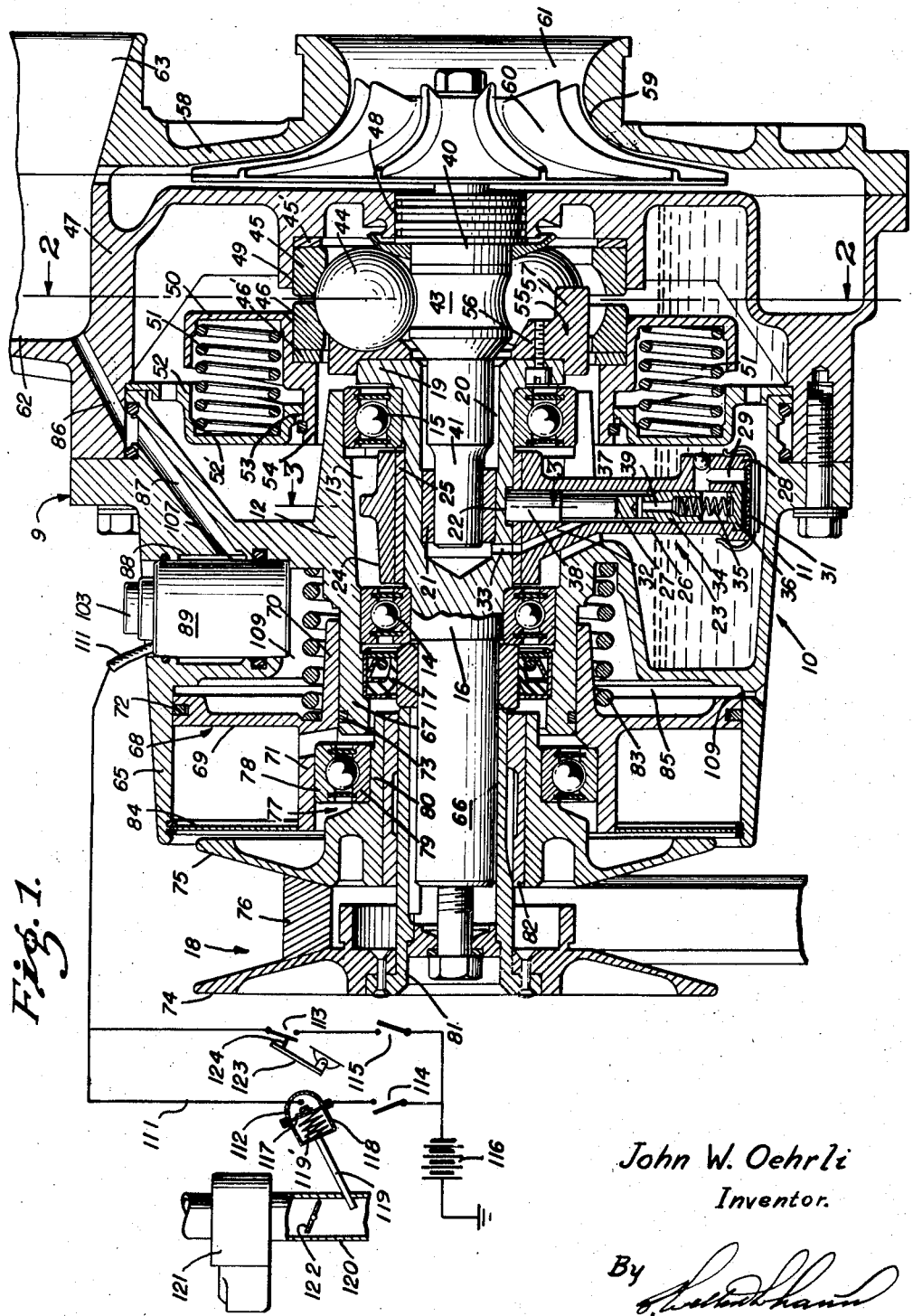
Fig. 1 is a schematic view, partly in section, of a preferred embodiment of the invention.

The high speed drive 9 of the invention as shown in Fig. 1, has a shell 10 of hollow construction comprising a body 11 having therein a cylindrical wall 12 defining within the body 11 a shaft receiving opening 13 in which ball bearings 14 and 15 support a driving shaft 16. A grease seal 17 is disposed around the shaft 16 in the end of the opening 13, and drive means, including a pulley 18, are connected to a projecting end of the shaft 16.

The shaft 16 has on its inner end a flange 19 and has an axial opening 20 extending inwardly from the inner end thereof. Adjacent the bottom of the opening 20 there is a pilot sleeve bearing 21, and in the outer face of the driving shaft 16, positioned between the bearings 14 and 15 there is an eccentric cam face 22 for operation of a pump 23 which is insertable in the body 10 as a separate unit. The pump 23 has a cylindrical wall 24 which surrounds that portion of the driving shaft 16 lying between the bearings 14 and 15. Within this cylindrical wall 24 there is a bearing bushing 25 arranged for engagement with the surface of the driving shaft 16. An arm 26 extends downwardly from the cylindrical wall 24 and has therein an opening 27 forming a pump cylinder arranged radially with respect to the axis of rotation of the driving shaft 16 and in alignment with the cam face 22. A boss 28 projects laterally from the lower portion of the arm 26 and has therein an oil intake passage 29. An oil intake screen 31 for the intake passage 29 is supported upon the boss 28. An oil discharge passage 32 extends diagonally from an intermediate portion of the cylinder 27 to a position adjacent the bottom of the opening 20 in the driving shaft 16 and a port 33, drilled laterally in the wall of the shaft 16 provides for direct communication between the discharge passage 32 and the bottom of the opening 20 from which the oil under pressure may pass rightwardly through the clearance between sleeve bearing 21 and shaft end 42.

The pump 23 includes a piston 34 which is slidable in the cylinder bore 27 and is urged toward the shaft 16 by a spring 35 which is held in place by a cover 36 disposed at the lower end of the cylinder bore 27. The piston 34 has a stem 37 which extends toward the shaft 16 and has thereon a head 38 which engages the eccentric cam face 22, with the result that rotation of the shaft 16 effects rotation of the cam face 22 around the axis of the shaft 16 and the piston 34 is thereby reciprocated. Passages 39 in the upper portion of the piston 34 connect the space within the cylinder 27 above the piston 34 with the interior of the piston 34 so that as the piston 34 is moved downwardly oil will be forced from below to above the piston and out through the passages 32 and 33. The piston 34 is positioned so that its lower end will act as a valve for the inlet passage 29. As the piston 34 is moved downwardly from the raised position in which it is shown in Fig. 1, toward the lowered position, the lower portion of the piston 34 closes the inner end of the passage 29.

A driven shaft 40 is disposed adjacent the inner end of the driving shaft 16 and is provided with a stem 41 which projects into the opening 20 of the shaft 16 and rotates within the bearing sleeve 21. The driven shaft 40 has a ball race 43 on the exterior thereof in which balls 44 are arranged. These balls 44 are held in the ball race 43 by outer race rings 45 and 46 disposed so as to engage outer portions of the balls 44. The hollow body 11 of the support or shell 10 has a cover 47 with an axial opening 48 through which a portion of the driven shaft 40 extends, and a recess 49 arranged to support at least one of the race rings. In the form of the invention shown, the race ring 45 is a close fit within the recess 49 so that it is held in a position concentric to the axis of the shafts 16 and 40 and there is a clutch ring 45' disposed in the bottom of the recess and against which the ring 45 rests, the clutch ring permitting slippage of the race ring 45 under excess load.

The race ring 45 engages an outer portion of each ball 44 lying to one side of the median plane of the balls 44 indicated by the line 2—2. The race ring 46, which is symmetrical to the ring 45 engages the outer portion of each ball 44 on the opposite side of the median plane of the balls 44. The race ring 46 is held and forcibly pressed toward the ring 45 by a clutch ring 46' which is supported by an annular supporting member 50 which is urged rightwardly by coil springs 51, the ring 46' permitting slippage of the race ring 46 under excess load. The springs 51 are arranged in a circle around the shaft 16 and the leftward ends thereof are seated in pockets 52' in a stationary annular supporting member 52, having an opening 53 to receive and guide the leftwardly extending portion 54 of the annular member 50.

A ball driving member 55 is provided for transmitting from the shaft 16, when it is driven, a rolling movement of the balls 44 within the race rings 45 and 46. The drive means 55 comprises a ring 56 which is secured to the rightward face of the flange 19 and which has fingers 57 which project into spaces between adjacent balls 44. When the shaft 16 is rotated the fingers 57 travel in a circle around the ball race 43 and cause the balls 44 to move in this circle, the result being that the balls 44 roll in the annular track provided by the race rings 45 and 46. That is to say, the balls 44 rotate about their own axes as the result of their engagement with the race rings 45 and then act as planets to rotate the driven shaft 40 at a speed considerably greater than the speed of rotation of the shaft 16. During the operation of the drive, oil from the pump 23 passes through the bearing clearance of sleeve 21 and then out through the opening 20 in the shaft 16 and through the driver 55 to the balls 44. A supercharger housing 58 is secured to the rightward face of the cover 47 and has therein a pumping space 59 in which an impeller 60 is rotated. Such impeller 60 is secured on the rightward end of the driven shaft 40 and is arranged to move air from an inlet port 61 in the housing 58 to volute discharge passage 62 having an outlet opening 63.

The race rings 45 and 46, as shown in Fig. 1, are of wedge shape cross section, and the result of the race ring 46 being forced toward the ring 45 is to press the balls 44 tightly into the ball race 43 and effect a positive contact of the balls 44 with the race members 43, 45 and 46.

At the leftward end of the body or shell 10, Fig. 1, there is a cylinder 65 surrounding the leftward portion 66 of the shaft 16 and also surrounding a portion 67 of the wall 12 which supports the bearings 14 and 15. Within the cylinder 65 there is an annular piston 68 comprising a radial wall 69 and rightwardly and leftwardly extending cylindrical walls 70 and 71. The cylindrical wall 70 is slidable upon the leftward portion 67 of the wall 12 and the periphery of the radial wall 69 is slidable along the inner face of the cylinder 65, there being sealing rings 72 and 73 operative between the annular piston 68 and the cylindrical walls 65 and 67. The pulley 18 comprises a fixed flange 74 and an axially movable flange 75. It is the purpose of the piston 68 to move the flange 75 toward the flange 74 and thereby increase the effective diameter of the pulley 18 and shift the belt 76 outwardly from the position in which it is shown in Fig. 1. This shifting of the flange 75 is accomplished by use of a ball bearing 77, the outer race 78 of which is carried within the cylindrical wall 71 of the piston 68 and the inner race 79 of which is mounted upon a sleeve 80 which projects rightwardly from the hub of the flange 75.

The flange 74 of the pulley 18 is fixedly secured to the leftward portion 66 of the shaft 16 by a sleeve 81 which extends through the hub of the flange 75 and within the sleeve 80 of the flange 75 and in surrounding relation to the shaft portion 66 upon which it is keyed. The sleeve 80 of the flange 75 contains therein a sleeve insert 82 which is splined on the sleeve 81, thereby permitting axial movement of the flange 75 along the sleeve 81 and the shaft portion 66 on which it is mounted. The inner race 79 of the ball bearing 77 rotates within the outer race 78. When air pressure against the rightward face of the annular piston 68 moves the same leftwardly, leftward movement will be transmitted through the ball bearing 78 to the flange 75, to move the same toward the flange 74. Leftward movement of the annular piston 68 is assisted by a compression spring 83. An annular wall 84 is supported within the outer end of the cylinder 65 and surrounds the leftward portion of the cylindrical wall 71 of the piston 68, to guard the interior of the cylinder 65 against entry of foreign matter.

Air is fed into the chamber 85 which exists adjacent the rightward face of the annular piston 68 from the outlet passage 62 of the supercharger housing, through a passage 86 formed in the cover 47 of the shell 10 and a passage 87 in the shell 10 arranged so that its leftward end will communicate with an intermediate portion of a cavity 88 formed in the shell to receive a pressure regulator 89, the details of which are shown in Fig. 4.

The regulator 89 includes a cylindrical shell 90 which contains a solenoid winding 91 arranged around a tube 92. Upper and lower core members 93 and 94, of annular form, are fitted into the ends of the solenoid 91 and a tubular iron armature 95 is slidably arranged within the tube 92 between the core inserts 93 and 94.

A valve member 96 is arranged in the upper portion of the opening 97 of the armature 95, this valve member 96 having a head 98 disposed above the armature 95 and having an air passage 99 which extends from a point adjacent the lower end of the head 98 to the lower end of the valve member 96. A coil spring 100 disposed between the upper end of the armature 95 and the valve head 98 urges the valve member upwardly against the central member 101 of a diaphragm 102 which is held in a position extending across the upper face of the core member 93 by a cap 103 which is secured in the upper end of the shell 90. A compression spring 104 urges the diaphragm 102 downwardly into the position in which it is shown in Fig. 4, and the position of the diaphragm 102 determines the position of the valve member 96. When the diaphragm 102 is raised from the position in which it is shown by air pressure applied to its lower face it will permit a small upward movement of the valve member 96 by the spring 100. The shell 90 has therein an air opening 105 which connects the space 106 within the shell 90 between the solenoid 91 and the core member 93 with the air passage 87 through a segregated portion 107 of the cavity 88. The core member 93 has an opening 108 therethrough for passage of air under pressure to the space adjacent the lower face of the diaphragm 102. Accordingly, when the armature 95 is in the position in which it is shown in Fig. 4, air may pass from the outlet passage 62 of the supercharger through passages 86 and 87, opening 105, space 106, opening 108, across the lower face of the diaphragm 102, through passage 99 of the valve member 96, through axial opening 97 of the armature 95 into the space 109 adjacent the rightward face of the annular piston 68, as indicated by the arrow 110. The pressure of this air will act to shift the piston 68 leftwardly.

One end of the solenoid winding 91 is grounded and the other end thereof is connected through a conductor 111 with control switches 112 and 113 which are arranged in series with manually operable switches 114 and 115 which are in turn connected to a source of electrical energy indicated as a battery 116, as shown in Fig. 1. One contact of the switch 112 is carried by a movable wall, such as a diaphragm 117 which forms one wall of a chamber 18 connected through a duct 119 with an intake duct 120 which connects a carburetor 121 with the cylinders of an internal combustion engine, not shown. The duct 119 is connected to the intake 120 at a point downstream from the butterfly valve 122 of the carburetor 121. When the engine is operating under low power or cruising condition, the butterfly valve 122 is nearly closed and a relative high vacuum will exist in the duct 120 downstream from the valve 122. This reduced pressure, or suction, acting within the chamber 18 will pull the diaphragm 117, against the compression of a control spring 119', in leftward direction so as to hold the switch 112 open. However, when the butterfly valve 112 is opened to give high power or rapid acceleration operation of the engine, the vacuum existing in the duct 120 below the valve 122 will be reduced so that the spring 119 may act against the diaphragm 117 so as to close the switch 112. As further schematically shown in Fig. 1, the accelertaor pedal 123 is arranged through a linkage 124 to close the switch 113 when the accelerator pedal 123 is depressed to a predetermined extent. If the operator of the internal combustion engine desires automatic operation of the supercharger control by the switch 112 or through the switch 113 he will close the selected manually operated switches 114 or 115 respectively associated therewith.

Figure 5:
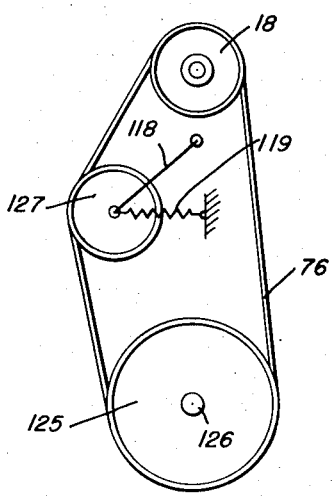
Fig. 5 is a schematic view showing the belt tensioning means of the variable ratio transmission of the system.

As schematically shown in Fig. 5, the belt 76 runs over a sheave 125 which is fixed on a shaft 126 of the internal combustion engine with which the supercharger system is employed, the speed of this shaft 126 varying with the speed of rotation of the engine crankshaft. The belt 76 also runs over an idler belt take up sheave 127, shown as being mounted on a lever arm 118 and being adapted to be moved by a spring 119 in a direction to hold the loop of the belt 76 tight on the driving sheave 117 and the variable diameter driven sheave 18.

The following is an explanation of a characteristic operation of the control. When the engine is operating at cruising speed and under low power conditions, the switch 112 will be open and the solenoid 91 will be de-energized so that the armature 95 will be in the lowered position in which it is shown in Fig. 4, the valve passage 99 being open so that air pressure from the outlet chamber 62 of the supercharger may pass freely to the chamber or face 109 adjacent the rightward face of the piston 68. As the speed of the engine is increased so that the speed of the supercharger impeller 60 is likewise increased, there will be an increase in pressure in the outlet chamber 62 of the supercharger and a corresponding increase in air pressure against the rightward face of the piston 68 so that the flange 75 of the variable diameter sheave 18 will be shifted leftwardly, thereby causing the position of the belt to move outwardly from the axis of the sheave 18. It will be seen that as the pressure of air delivered by the supercharger increases above approximately a predetermined value the driving ratio through the sheave 125 and 18 and the belt 76 will be reduced as the result of the leftward shifting of the flange 75, thereby holding the pressure in the outlet chamber 62 of the supercharger at a relatively low value, for example, between 1 to 2 lbs. per sq. in. up to engine cruising speeds of about 3500 R. P. M. at which point the drive ratio is at a minimum. If additional power for hill climbing or rapid acceleration required opening of the butterfly valve 122, the reduction in vacuum in the duct 120 to a point where the pressure rises to a value near atmospheric will result in the closing of the switch 112, energizing the solenoid 91 so that the armature 95 will be magnetically pulled upwardly into engagement with the lower face of the head 98 of the valve member 96, thereby closing the passage 99 and preventing air pressure from the outlet chamber 62 of the supercharger from passing to the chamber 109 adjacent the rightward face of the piston 68 and air pressure in chamber 109 is bled off through orifice 109'. At this time the piston 68 will be moved rightwardly by belt tension produced by idler spring 119 and the belt 76 will move toward high driving ratio position, as shown in Fig. 1 until the air pressure built up in the outlet chamber 62 of the supercharger has reached a value sufficiently high, for example about 5 lbs. per sq. in., to lift the diaphragm 102 of the pressure regulator 89 against the downward force of the control spring 104. This raising of the diaphragm 102 will result in an upward movement of the part 101 thereof so that the spring 100 may lift the valve member 96 upwardly away from the upper end of the armature 95 which is now stopped against the downwardly projecting portion 128 of the upper core member 93. This relative upward movement of the valve member 96 will permit air under pressure to pass through the passage 99 to the space 109, to then act against the rightward face of the piston 68 to shift the same leftwardly and reduce the driving ratio of the belt transmission as the result of moving the flange 75 toward the flange 74, preventing increase in speed of the supercharger impeller 60 measurably above that which will produce an air pressure of about 5 lbs. per sq. in. in the outlet chamber 62 of the supercharger and therefore in the inlet duct leading to the fuel intake means of the internal combustion engine, shown in this example of the invention as being the carburetor 121.

Figure 6:
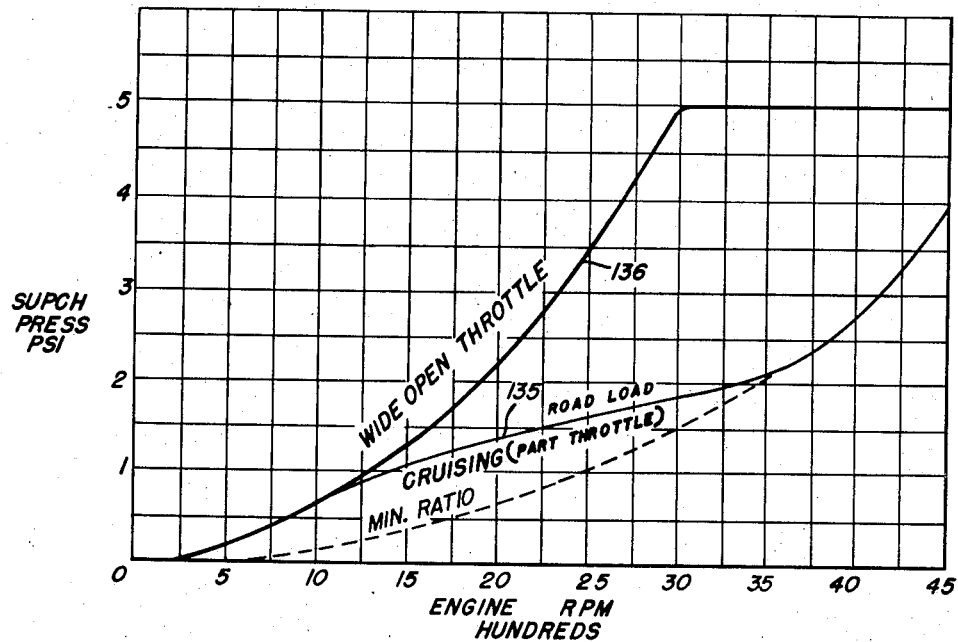
Fig. 6 is a graph of the type of air pressure control obtainable in the use of the system.

As shown in Fig. 6, which has reference to a gasoline driven engine of an automobile equipped with the supercharger system, the air pressure delivered to the engine intake during cruising conditions wherein the throttle is only partly open, will be as indicated by the curve 135. Under high power or rapid acceleration conditions using substantially wide open throttle will result in a delivery of air under pressure as indicated by the curve 136.

I claim:

1. In a high speed drive: a drive shaft; supporting means including bearings for the drive shaft; a driven shaft at the end of said drive shaft having a ball race thereon; balls disposed around said ball race and in engagement therewith; outer wall means around said driven shaft connected to said supporting means and having a cylindrical wall portion facing toward the outer portions of said balls; first and second race rings, at least one of which is supported so that it may revolve around the axis of said ball race, engaging the outer portions of balls on opposite sides of and adjacent to the median plane of said balls, the first of said rings being supported against radial and axial movements by said cylindric wall and the second of said rings being movable toward the first of said rings; friction means resisting rotation of said ring which is rotatable around the axis of said ball race; a plurality of coil springs arranged around the axis of said shafts operating to urge said second ring toward said first ring; and drive fingers extending from said drive shaft into spaces between said balls to transmit from said drive shaft force to cause said balls to roll in a circle within said race rings and drive said ball race of said driven shaft at a speed of rotation higher than that of said driving shaft.

2. In a high speed drive: a drive shaft having a sleeve bearing at the end thereof; supporting means including bearings for the driving shaft; a driven shaft at the end of said driving shaft having a portion which extends into said sleeve bearing and having a ball race thereon; balls disposed around said ball race and in engagement therewith; outer wall means around said driven shaft connected to said supporting means; first and second race rings respectively engaging the outer portions of said balls on opposite sides of and adjacent to the median plane of said balls, the first of said rings being supported against radial and axial movements by said outer wall means, said race rings being both supported so that they may have rotation around the axis of said ball race; friction means resisting rotation of said race rings; spring means urging said race rings toward each other so that a pressural engagement of said race rings with the balls will be effected; and drive means extending from said driving shaft and having parts engaging said balls to transmit from said driving shaft force to cause said balls to roll in a circle within said race rings.

3. In a high speed drive: a drive shaft; supporting means including bearings for the driving shaft; a driven member at the end of said driving shaft and having a ball race thereon; balls disposed around said ball race and in engagement therewith; outer wall means around said driven member connected to said supporting means; first and second race rings respectively engaging the outer portions of said balls on opposite sides of and adjacent to the median plane of said balls, the first of said rings being supported against radial and axial movements by said outer wall means, said race rings being both supported so that they may have rotation around the axis of said ball race; friction means resisting rotation of said race rings; spring means urging said race rings toward each other so that pressural engagement of said race rings with the balls will be effected; and drive means extending from said driving shaft and having parts engaging said balls to transmit from said driving shaft force to cause said balls to roll in a circle within said race rings.

4. In a high speed drive: a drive shaft; supporting means including bearings for the drive shaft; a driven shaft at the end of said drive shaft bearing a ball race thereon adjacent the end of said drive shaft; balls disposed around said ball race and in engagement therewith; outer wall means around said driven shaft connected to said supporting means and having a cylindrical wall portion facing toward the outer portions of said balls and a shoulder facing toward the median plane of said balls; first and second race rings engaging the outer portions of said balls on opposite sides of and adjacent to the median plane of said balls, the first of said rings being supported against radial movement by said cylindrical wall portion member mounted on said second race ring and having a radial shoulder facing toward the median plane of said balls; friction rings arranged between said race rings and said shoulders of said outer wall means and said ring member for resisting rotation of said race rings around the axis of said ball race; a plurality of coil springs arranged around the axis of said shafts between said supporting means and said ring member, urging said ring member toward the median plane of said balls, to effect a pressural engagement of said race rings with said balls; and drive fingers extending from said drive shaft into spaces between said balls to transmit from said drive shaft force to cause said balls to roll within said race rings and drive said ball race and said driven shaft.

5. In a high speed supercharger mechanism: a supercharger housing having a radial wall with an axial opening therein; an impeller in said housing having a stub shaft extending through said opening, said shaft having a ball race thereon adjacent said wall; a plurality of balls around said stub shaft and seated in said race; a first annular race ring support on said radial wall concentric to the axis of said opening therein; a first race ring rotatably carried by said first race ring support in a position to engage the outer portions of said balls on one side of the median plane of said balls; a second race ring support spaced from said first named race ring support; a second race ring rotatably carried by said second race ring support in a position to engage the outer portions of said balls on the opposite side of said median plane, said race rings and said balls supporting said stub shaft for rotation on the axis of said race rings; a drive shaft extending axially from said stub shaft; a support having bearing means supporting said drive shaft in axial alignment with said stub shaft; means on said driving shaft engaging said balls so as to cause them to roll within said race rings and thereby effect revolution of said stub shaft and said impeller; annular friction members engaging and resisting rotation of said race rings so that they will rotate when heavy torque is applied thereto; and means operating to move said race rings relatively toward each other so that said balls will be urged toward said race of said stub shaft.

6. In a ball type planetary drive mechanism: a first shaft, said shaft having a ball race; a second shaft extending axially from said first shaft; a support having bearing means supporting said second shaft in axial alignment with said first shaft; a plurality of balls around said first shaft and seated in said race; a first annular race ring support connected to said support concentric to the axis of said first shaft; a first race ring rotatably carried by said first race ring support in a position to engage the outer portions of said balls on one side of the median plane of said balls; a second race ring support spaced axially from said first named race ring support; a second race ring rotatably carried by said second race ring support in a position to engage the outer portions of said balls on the opposite side of said median plane; friction members engaging and resisting rotation of said race rings so that they will rotate when heavy torque is applied thereto; means on said second shaft extending between said balls so as to effect a driving connection between said balls and said second shaft; and spring means disposed so as to urge said second race ring toward said first race ring so that the race rings will act upon said balls to force the same radially toward said race of said first shaft, whereby said first annular race ring support, said race rings and said balls hold said first shaft concentric to the axis of said race rings.

References Cited in the file of this patent

UNITED STATES PATENTS

| | | |
|---|---|---|
| 1,380,006 | Nielsen | May 31, 1921 |
| 1,585,140 | Erban | May 18, 1926 |
| 1,737,997 | Garrard | Dec. 3, 1929 |
| 2,010,793 | Winkler | Aug. 6, 1935 |
| 2,065,008 | Madle | Dec. 22, 1936 |
| 2,187,737 | Gregory | Jan. 23, 1940 |
| 2,192,084 | Kamenarovic | Feb. 27, 1940 |
| 2,205,768 | Pearce | June 25, 1940 |
| 2,217,364 | Halford et al. | Oct. 8, 1940 |
| 2,344,078 | Brissonnet et al. | Mar. 14, 1944 |
| 2,472,802 | Bentley | June 14, 1949 |
| 2,528,470 | Elder | Oct. 31, 1950 |
| 2,556,191 | Jorgensen et al. | June 12, 1951 |